Feb. 22, 1949. H. N. PEDERSEN 2,462,769
STABILIZABLE BICYCLE
Filed Feb. 6, 1946 2 Sheets-Sheet 1

Inventor
Hayes N. Pedersen
By: Walter M. Fuller
Atty.

Feb. 22, 1949.  H. N. PEDERSEN  2,462,769
STABILIZABLE BICYCLE
Filed Feb. 6, 1946  2 Sheets—Sheet 2
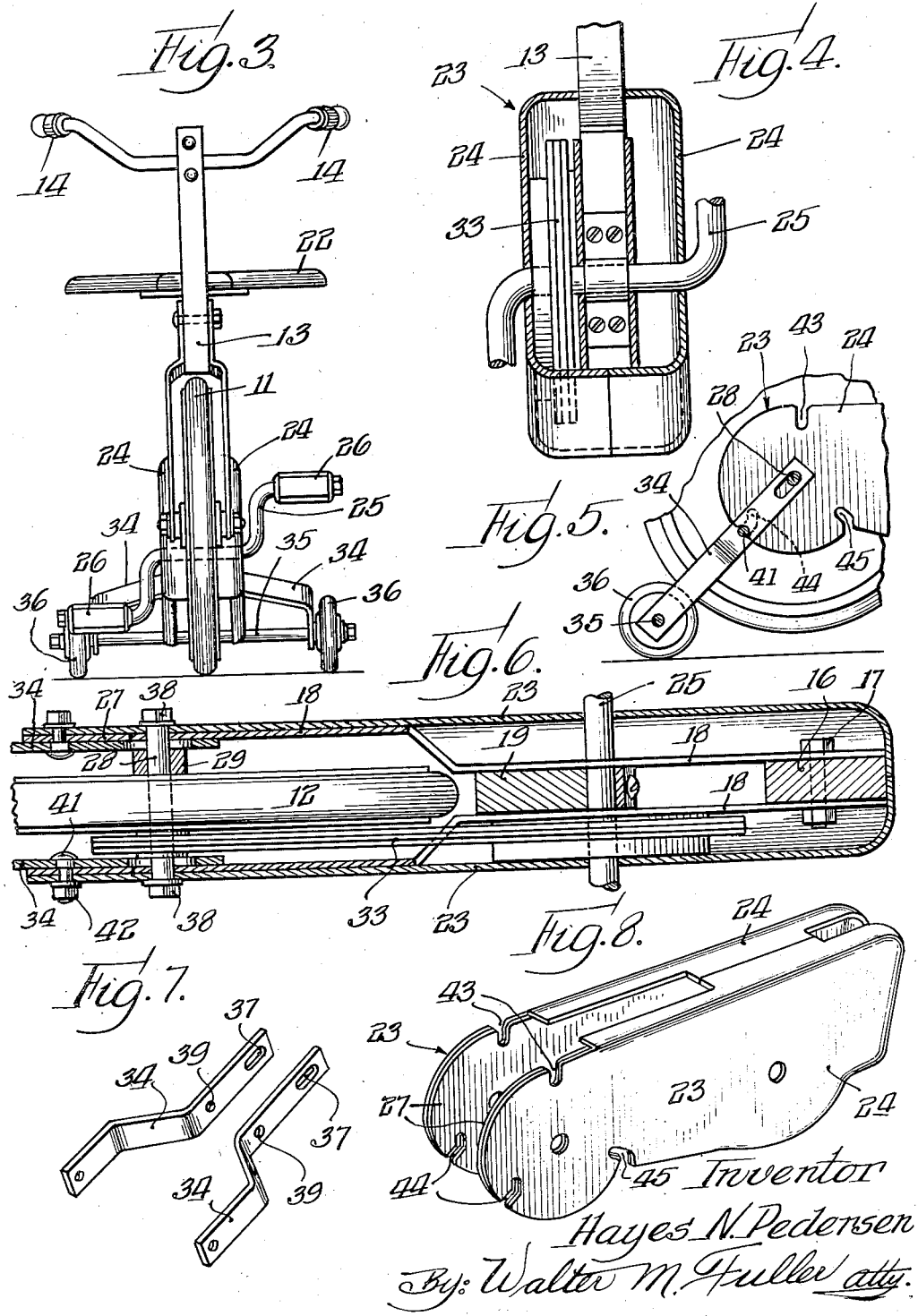
Inventor
Hayes N. Pedersen
By: Walter M. Fuller atty.

Patented Feb. 22, 1949

2,462,769

UNITED STATES PATENT OFFICE 2,462,769

STABILIZABLE BICYCLE

Hayes N. Pedersen, Racine, Wis.

Application February 6, 1946, Serial No. 645,799

4 Claims. (Cl. 280—303)

The present invention pertains to certain novel and advantageous developments and improvement in bicycles and the like, and concerns more particularly those adapted for use by children to assist them in learning to ride them and while so doing affording reasonable safety for such beginners.

Stated somewhat otherwise, such invention relates to the provision of effective and efficient stabilizing-means for the bicycle to prevent its tipping over while in use, and, because of some of its physical characteristics and properties, it may provide more than one degree of stability whereby, as the child develops its skill in operating the bicycle, the amount of aid rendered by the new appliance may be lessened and possibly eventually eliminated.

In order that those skilled in the art may understand the invention and thereby appreciate the benefits accruing from its employment a present preferred embodiment thereof has been illustrated in detail in the accompanying drawings, forming a part of this specification and to which reference should be had in connection with the following detailed description. For simplicity, like parts of the apparatus, in the several views of the drawings, have been supplied with the same designating numerals.

Figure 1:
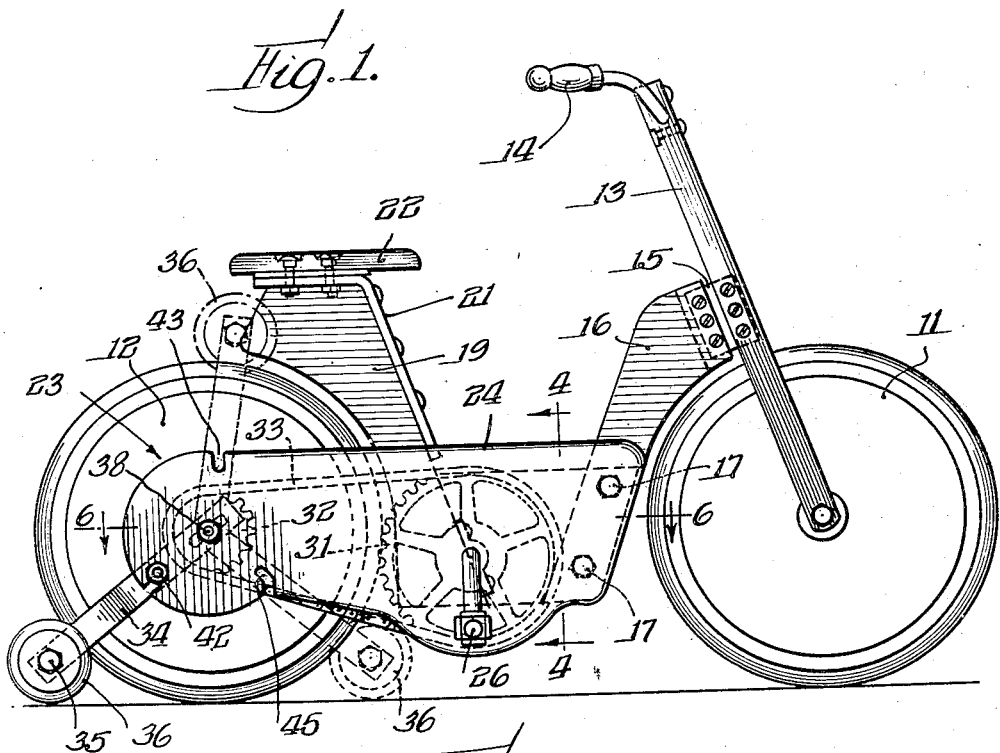
Figure 1 is a side elevation of a small bicycle equipped with such physical embodiment of the instant invention in operative position.
Figure 2:
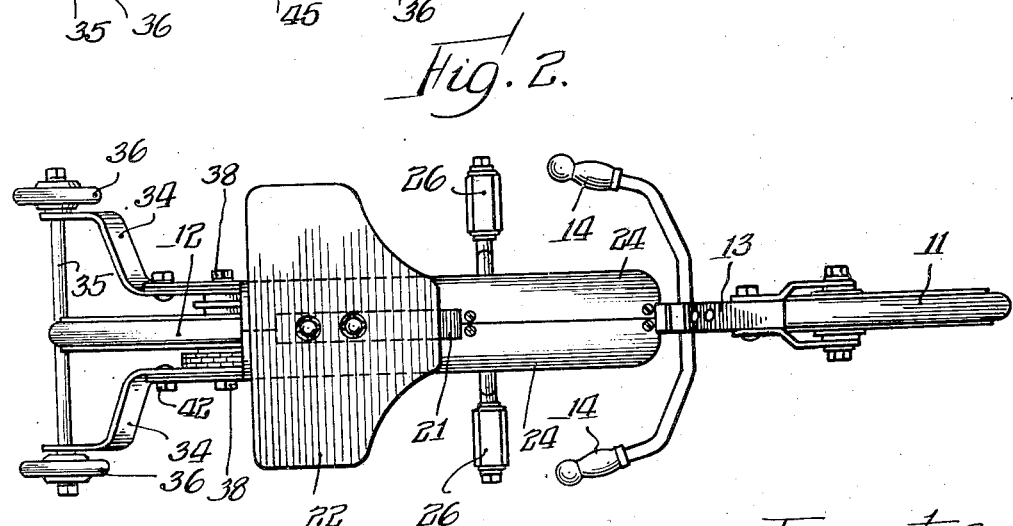
Figure 2 shows a plan view of such structure.

Figure 3 presents a front view of the appliance;

Figure 4 portrays an enlarged, vertical section on line 4—4 of Figure 1;

Figure 5 is a fragmentary, longitudinal, vertical section;

Figure 6 depicts a horizontal, lengthwise section on line 6—6 of Figure 1;

Figure 7 shows in perspective the adjustable bracket on which the stabilizing-wheels are mounted; and Figure 8 is a view of the metal side-plates of the bicycle in perspective.

By reference to these several views, it will be noted that the bicycle of small size, suitable for use by a child, includes the customary front and rear rubber-tired wheels 11 and 12, respectively, the front wheel as usual being mounted in a forked steering-post 13 fitted at its top with handle-bars 14, 14, such fork and wheel being adapted for sidewise-rocking steering-action by being hinged at 15 to an upwardly, forwardly extended, wood supporting-member 16, the latter at its lower part being mounted at 17 in the main-body of the bicycle between a pair of bent metal-plates 18, 18 to which it is bolted or otherwise fastened.

The construction includes also a second, wood member 19 whose lower end is mounted on and supported by the same two parts 18, 18, the front and top edge of such element 19 being reinforced by a metal-bar 21 secured thereon, as by screws, the seat 22 of the bicycle being fastened to the upper portion of bar 21, as illustrated.

The specified main-body includes also two longitudinal, external, metal side-plates 23, 23 with inturned strengthening flanges 24, 24 along their top, front and bottom edges and recessed, as illustrated, to accommodate some of the parts of the mechanism.

The transverse drive-shaft 25 extends through and has suitable bearings in the main-body of the structure and is equipped at its opposite ends with the usual pedals 26, 26.

Near the back end of the vehicle and accommodated in aligned apertures in the metal walls 18 and 23 is the rear-shaft 28 on which the wheel 12 is mounted, such shaft extending also through a bearing or sleeve 29 (Figure 6) to maintain the wheel 12 in proper relation.

Shaft 25 has the usual sprocket-wheel 31 thereon and shaft 28 has the companion pinion 32 thereon, such two parts being operatively connected together by the customary sprocket-chain 33, so that the child sitting on the seat and operating the pedals can rotate the rear-wheel 12 and propel the vehicle.

The details of construction of the bicycle so far as described are of little importance, the invention residing in the new structure now to be presented.

The opposite bent arms or bars 34, 34 of a bracket are suitably connected together at their lower, widely-spaced ends by a cross-shaft 35 on the opposite protruding portions of which are mounted a pair of rubber-tired, small-size stabilizing ground-wheels 36, 36, the arms 34, 34 of this bracket near their upper ends being longitudinally slotted in register at 37, 37 to accommodate the shaft 28, the latter being maintained in place by its terminal-nuts 38, 38.

Each arm 34 in an aperture 39 carries a bolt 41 with an external nut 42.

As will be noted, the rear-end portion of each side-plate 23 and its inner reinforcing plate 27 have three slots extending inwardly from their common margin with the corresponding slots of the four plates in transverse register, and as is perhaps most clearly presented in Figure 8, these slots are designated 43, 43, 44, 44, and 45, 45, the two slots 43 being at the top of the plate, the two slots 44 being to the rear of shaft 28, and the two slots 45 being forwardly of such shaft.

The bracket rotarily and lengthwise adjustably mounted on shaft 28 and its two wheels 36, 36 constitute the stabilizing-appliance for the bicycle, it being observed that the rear edges of the reinforced plates 23, except for their slots, are concentric with the axis of shaft 28.

When the bracket is swung up and its bolts 41, 41 occupy slots 43, 43 then the stabilizing device is up in inoperative, elevated position with the wheels 36 lower than, and at least in part under, the seat 22. The bolts in this instance may or may not be tightened.

When the greatest stabilizing effect is desired, the bracket is pulled up from such inoperative position until the bolts are freed from the slots and the bracket is then swung down and the two bolts entered in the two slots 45 while the rear portion of the bicycle is temporarily elevated slightly and then the bolts are tightened to lock the bracket and wheels fixedly in position, this shifting of the parts being rendered possible due to the fact of the shaft 28 occupying the slots 37, 37 in the bracket side-bars.

The reason that a greater degree of stabilization is effected when the rollers or wheels 36, 36 are in this position is that they are in approximately the same transverse plane as the center-of-gravity of the occupied bicycle.

If a lesser degree of transverse stability is required, then the bolts 41, 41 are released and the rear portion of the bicycle lifted to free them from the slots 45, 45 and the bracket is swung around to cause the bolts to register with, and to enter, the remaining set of slots 44, 44 whereupon the bolts are again tightened to hold the bracket and wheels firmly in position, this change, of course, being permissible because of the play between the slots 37 and the shaft 28 on which the bracket is mounted.

The slots 44 and 45 may be straight radially with respect to the axis of shaft 28 like slots 43 or they may be partly radial with inner bends, as illustrated, to maintain the bolts fixedly in place with less gripping action required by their nuts.

Thus, as the child begins to learn to ride the bicycle it is well stabilized because it has not only its own pair of wheels but also the two additional transversely-arranged wheels of the new appliance, and, after some facility in riding the vehicle so constituted has been accomplished, then the stabilized wheels may be shifted to the rearward position where they afford a lesser degree of stability, and, ultimately, when the child has acquired sufficient aptitude so that he no longer requires such stabilized action, this auxiliary appliance may be shifted and maintained in its upper and inoperative position.

Those acquainted with this art will readily understand that the present invention, as defined hereinafter, is not necessarily limited and restricted to the precise and exact details set forth above and that reasonable modifications may be resorted to without departure from the heart and essence of such invention and without the loss or sacrifice of any of its material benefits and advantages.

I claim:

1. In a prior-art type of stabilizing-apparatus, associated with a juvenile-bicycle whose two wheels always engage the floor or ground when the bicycle is in operation, said apparatus having a bracket movably mounted on the bicycle straddling its rear-wheel and having a pair of supplemental transversely registered stabilizing ground-wheels rotatable on said bracket in spaced-apart relation crosswise said rear-wheel and adapted to be moved with the bracket into an operative stabilizing position on the ground or floor, the novel combination of means on said bracket and cooperating means on the body of the bicycle to locate said stabilizing-wheels in one operative position with their common axis ahead of the axis of the bicycle rear-wheel or to locate said stabilizing-wheels in another operative position with their common axis to the rear of the axis of the bicycle rear-wheel, and means to releasably lock said bracket and its wheels in either of said two positions, the stabilizing effect of such wheels being greater in said advanced position than in said rear position.

2. The novel combination in the bicycle stabilizing-apparatus set forth in claim 1, in which each of said locating-means comprises a pin-and-slot separable means.

3. The novel combination set forth in claim 2, in which said pin-means is on said bracket and in which said slot-means is in the side plate means of the bicycle.

4. The novel combination set forth in claim 1, including in addition the novel features that the mounting for said bracket includes registered longitudinal slots in the arms of the bracket occupied by the rear-axle of the bicycle permitting rocking and lengthwise movement of the bracket and said locating means comprises manually disengageable pin-and-slot constructions between the bracket and the body of the bicycle.

HAYES N. PEDERSEN.

REFERENCES CITED

The following references are of record in the file of this patent:

UNITED STATES PATENTS

| Number | Name | Date |
|---|---|---|
| 224,961 | Sims | Feb. 24, 1880 |
| 359,127 | Brusie | Mar. 8, 1887 |
| 613,675 | Gutowitz | Nov. 8, 1898 |
| 619,103 | Vander Weyde | Feb. 7, 1899 |
| 761,516 | Lloyd et al. | May 31, 1904 |
| 1,251,684 | Murray | Jan. 1, 1918 |